US012182793B2

(12) United States Patent
Hay et al.

(10) Patent No.: US 12,182,793 B2
(45) Date of Patent: Dec. 31, 2024

(54) USER AUTHENTICATION AND TRANSACTION STAGING

(71) Applicant: Mastercard International Incorporated, Purchase, NY (US)

(72) Inventors: Florent Hay, Laeken (BE); Kuan Hua Chen, London (GB); David Anthony Roberts, Cheshire (GB)

(73) Assignee: MASTERCARD INTERNATIONAL INCORPORATED PURCHASE, Purchase, NY (US)

( * ) Notice: Subject to any disclaimer, the term of this patent is extended or adjusted under 35 U.S.C. 154(b) by 415 days.

(21) Appl. No.: 16/156,560

(22) Filed: Oct. 10, 2018

(65) Prior Publication Data

US 2019/0114617 A1 Apr. 18, 2019

(30) Foreign Application Priority Data

Oct. 13, 2017 (EP) .................................... 17196489

(51) Int. Cl.
*G06Q 20/32* (2012.01)
*G06F 21/36* (2013.01)
(Continued)

(52) U.S. Cl.
CPC ......... *G06Q 20/3274* (2013.01); *G06F 21/36* (2013.01); *G06K 7/1417* (2013.01); *G06Q 20/36* (2013.01); *G06Q 20/3674* (2013.01); *G06Q 20/3821* (2013.01); *G06Q 20/4012* (2013.01); *G06Q 20/40145* (2013.01); *H04W 12/06* (2013.01); *G06Q 2220/00* (2013.01)

(58) Field of Classification Search
CPC .............................. G06Q 20/32; G06Q 20/40
See application file for complete search history.

(56) References Cited

U.S. PATENT DOCUMENTS 8,380,177 B2 * 2/2013 Laracey ............ G06Q 30/0253
455/414.1
8,676,707 B2 * 3/2014 Flitcroft ................. G06Q 20/10
705/35

(Continued)

FOREIGN PATENT DOCUMENTS

CN 105593883 A 5/2016
KR 10-2016-0048784 A 5/2016
(Continued)

OTHER PUBLICATIONS

"European Search Report", European Patent Office, Mar. 2, 2018, European Application No. 17196489.3, 7 pp.

(Continued)

*Primary Examiner* — Daniel S Felten
(74) *Attorney, Agent, or Firm* — Talem IP Law, LLP

(57) ABSTRACT

There is presented a method and a computing device for user authentication and transaction staging on a user device. The method comprises authenticating a user of the user device by a first device verification method and generating transaction credentials at the user device. The method further comprises generating at least one optical code data corresponding to the transaction credentials and displaying the at least one optical code on the user device in a form suitable for scanning by a second device to progress a transaction with the second device.

6 Claims, 15 Drawing Sheets

(51) Int. Cl.
*G06K 7/14* (2006.01)
*G06Q 20/36* (2012.01)
*G06Q 20/38* (2012.01)
*G06Q 20/40* (2012.01)
*H04W 12/06* (2021.01)

(56) References Cited

U.S. PATENT DOCUMENTS

| | | | | |
|---|---|---|---|---|
| 8,831,677 | B2 * | 9/2014 | Villa-Real | H04M 1/66 |
| | | | | 455/552.1 |
| 9,613,306 | B2 * | 4/2017 | Deliwala | G06Q 20/36 |
| 9,734,652 | B1 * | 8/2017 | Metral | G06K 19/07 |
| 10,248,949 | B2 * | 4/2019 | Sandelov | G06K 19/06206 |
| 10,417,630 | B2 * | 9/2019 | Liu | G06Q 20/204 |
| 10,460,314 | B2 * | 10/2019 | Hird | G06Q 20/3829 |
| 10,565,575 | B2 * | 2/2020 | Fisher | G06Q 20/4012 |
| 10,810,585 | B2 * | 10/2020 | Kadiwala | G06Q 20/32 |
| 10,872,333 | B2 * | 12/2020 | Dua | G06Q 20/322 |
| 10,977,652 | B1 * | 4/2021 | Twilley | G06Q 20/401 |
| 11,037,139 | B1 * | 6/2021 | Ho | G06Q 20/34 |
| 11,055,683 | B1 * | 7/2021 | Bartholomew | G06Q 20/34 |
| 11,062,302 | B1 * | 7/2021 | Ho | G06Q 20/3672 |
| 11,068,890 | B2 * | 7/2021 | Bacastow | G06Q 20/4012 |
| 11,080,693 | B2 * | 8/2021 | Fiske | G07F 7/127 |
| 11,113,688 | B1 * | 9/2021 | Ho | G06Q 20/108 |
| 11,620,654 | B2 * | 4/2023 | Liscia | G06Q 20/326 |
| | | | | 705/71 |
| 11,783,061 | B2 * | 10/2023 | Lopez | G06Q 20/3278 |
| 11,803,825 | B2 * | 10/2023 | Purves | G06Q 30/0222 |
| 11,875,344 | B2 * | 1/2024 | Flurscheim | G06Q 20/327 |
| 2007/0022058 | A1 | 1/2007 | Labrou et al. | |
| 2015/0067781 | A1 | 3/2015 | Dang | |
| 2015/0227922 | A1 | 8/2015 | Filler et al. | |
| 2016/0162883 | A1 | 6/2016 | Liscia et al. | |
| 2019/0066089 | A1 * | 2/2019 | Miryala | G06Q 20/367 |
| 2020/0043012 | A1 * | 2/2020 | Tavares | G06Q 30/00 |

FOREIGN PATENT DOCUMENTS

| | | | | |
|---|---|---|---|---|
| WO | 2014080353 | A1 | 5/2014 | |
| WO | WO 2014/080353 | * | 5/2014 | G06Q 20/34 |
| WO | 2015028664 | A1 | 3/2015 | |
| WO | 2015/134403 | A1 | 9/2015 | |

OTHER PUBLICATIONS

PCT International Search Report and Written Opinion, European Patent Office, Nov. 26, 2018, PCT Application No. PCT/US2018/053301, 10 pp.
Communication pursuant to Article 94(3) EPC Issued in European Application No. 17 196 489.3, mailed Feb. 15, 2021, 7 pages.
Office Action issued in Korean Application No. 10-2020-7010270, Mailed Aug. 30, 2021, 7 Pages.
First Office Action issued in Chinese Application No. 201880066543.X, mailed Mar. 15, 2023, 13 pages.

* cited by examiner

| Data Field | Length | Format |
|---|---|---|
| Primary Account Number | var. up to 19 nibbles | n |
| Field Separator | 1 nibble | b ('D') |
| Expiration Date (YYMM) | 2 | n (YYMM) |
| Service Code | 3 nibbles | n |
| Discretionary Data | var. | n |
| Padded with 'F' if needed to ensure whole bytes | 1 nibble | b |

Figure 14

USER AUTHENTICATION AND TRANSACTION STAGING

CROSS-REFERENCE TO RELATED APPLICATION

This application is a U.S. National Stage filing under 35 U.S.C. § 119, based on and claiming benefits of and priority to European Patent Application No. 17196489.3 filed on Oct. 13, 2017. The entire disclosure of the above application is incorporated herein by reference for all purposes.

TECHNICAL FIELD

The present disclosure relates to user authentication and transaction staging particularly, but not exclusively, on a computing device. Aspects of the disclosure relate to a method and a computing device.

BACKGROUND

It is now commonplace to conduct payment transactions electronically such as by using, for example, a debit card, a credit card or an electronic wallet on a mobile device. Two main types of electronic payment transactions currently dominate the payments industry when using debit or credit cards: magnetic-stripe transactions and Europay, MasterCard and Visa (EMV) transactions. Magnetic-stripe transactions involve using a card that is capable of storing data on a band of magnetic material—the magnetic stripe—on the card. To perform a magnetic-stripe transaction, the payment card is swiped into a terminal by a cardholder.

There are two categories of EMV transactions: contact transactions and contactless transactions. Contact EMV transactions, like magnetic-stripe transactions, require that the card be in contact with the terminal for the transaction to occur. In contrast, contactless transactions rely on near field communication (NFC) technology. To perform a contactless EMV transaction, the payment card is tapped against a terminal by the cardholder when prompted to do so.

Typically, a payment transaction performed using an electronic wallet (e-wallet) application uses NFC technology to provide payment credentials from an electronic device to a merchant's point-of-sale (POS) terminal. At present there are several issues with using NFC for performing payment transactions.

Firstly, the user's electronic device and the merchant's POS terminal must both be compatible with NFC technology for the transaction to be performed. There are many electronic devices that are not compatible with NFC such as, for example, Apple's iPhone up to and including iPhone 5S. More recent models of Apple's iPhone, such as from the iPhone 6 up to and including iPhone 7 plus, include NFC capability; however the NFC capability of these iPhone models is exclusive to ApplePay and cannot be accessed by e-wallets other than ApplePay. Although contactless mobile payments are becoming more popular, not all merchants are able to accept NFC payments as they would require a compatible card reader, which may for some merchants be more expensive requiring the introduction of a POI device in comparison with the ease of reusing an already present barcode reader.

Alongside NFC technology, some e-wallets support the use of one-dimensional or two-dimensional barcode technology, for example Quick Response Code (QRC) is an example of a two-dimensional barcode, to perform electronic payment transactions. The main advantage of using QRC technology for making payments is ubiquity—any smartphone is capable of installing the software required for displaying a QRC and any smartphone equipped with a camera is capable of installing the software required for reading a QRC. Further, performing a transaction by QRC is quick, easy and convenient for the user.

There are, however, issues with current methods of payment by QRC. For example, currently when using QRC for payment transactions, both the merchant and the user are required to have a data connection. In addition, the scanning of the QRC for performing a payment transaction is not guaranteed to function on every occasion. Further, there are issues with the security of the payment transaction. For example, the unidirectional nature of QR means that it is not possible for the terminal to participate in the security of the cryptogram generation hence an alternative means to ensure "freshness" is needed.

Therefore there is scope for improvement on current methods of electronic payments. The present disclosure has been devised to mitigate or overcome at least some of the above-mentioned problems.

SUMMARY OF THE DISCLOSURE

According to an aspect of the present disclosure there is provided a computer-implemented method of user authentication and transaction staging on a user device. The method comprises authenticating a user of the user device by a first device verification method and generating transaction credentials at the user device. The method further comprises generating at least one optical code data corresponding to the transaction credentials and displaying the at least one optical code on the user device in a form suitable for scanning by a second device to progress a transaction with the second device.

Each of the at least one optical code may be a barcode.

An electronic wallet may be opened before generating transaction credentials on the user device.

A payment card may be selected from one or more payment cards associated with the electronic wallet to be used for the transaction.

Transaction information may be entered at the user device and the transaction information may be included in the at least one barcode.

The at least one barcode may comprise a one-dimensional barcode and a two-dimensional barcode. At least the two-dimensional barcode may be displayed.

The barcode data may comprise formatted transaction data.

The method may further comprise generating at a processor of the user device one or more unpredictable numbers for a transaction, and using the unpredictable numbers to generate the at least one barcode.

The one-dimensional code may be generated using formatted Dynamic Magstripe data, and the two-dimensional code may be generated using formatted EMV data and formatted Dynamic Magstripe data.

The transaction credentials may be time-limited.

The transaction credentials may be authenticated by the merchant using EMV combined data authentication to place an asymmetric cryptogram in the barcode.

The transaction credentials may be generated by the user device without requiring input by the user.

The method may further comprise receiving a notification with the transaction credentials at the user device for corroboration of the transaction by the user.

According to an aspect of the present disclosure there is provided a computing device adapted for user authentication and transaction staging, comprising at least one processor and at least one memory and an electronic wallet application. The computing device is adapted to authenticate a user of the device by a method of verification. The device is adapted further to generate transaction credentials and generate at least one optical code data corresponding to the transaction credentials. Further the device is adapted to display the at least one optical code on the computing device in a form suitable for scanning by a second device to progress a transaction with the second device.

BRIEF DESCRIPTION OF THE DRAWINGS

One or more embodiments of the disclosure will now be described, by way of example only, with reference to the accompanying drawings, in which like components are assigned like numerals and in which:

FIG. 14 comprises a table indicating the layout of the Track 2 Equivalent Data that is processed in order to process a M/Chip transaction.

DETAILED DESCRIPTION

The claimed method provides a payment solution that uses optical code scanning and is integrated into an application.

The approach taken to performing an electronic payment involves using an electronic wallet to make more secure and convenient payment transactions. The claimed method involves generating and displaying an optical code comprising the payment transaction credentials on a user device. The optical code may be a non-complex graphic sign that contains encoded information, such as an optical glyph, or a one-dimensional or multi-dimensional barcode. Once the optical code is displayed, it can be scanned by a merchant device to perform a payment transaction. If, however, a near-field communication (NFC) signal is detected, an NFC contactless payment may take priority over the scanning of the optical code to perform a payment transaction. For example, if an NFC signal is detected, the optical code may be removed from the screen and a regular contactless payment transaction may be performed.

The optical code displayed on the user device may be a one-dimensional (1-D) barcode, such as a Code 128 barcode or any code that uses a series, or a two-dimensional barcode (2-D), such as a Quick Response Code (QR Code or QRC). The specific embodiments described in detail below use 1-D and 2-D barcodes, but as the skilled person will appreciate different forms of optical code may be employed as discussed above. Multiple barcodes may be displayed on the user device which enables the merchant to select which barcode to scan depending on their terminal capabilities. Optionally, the user may enter information about the transaction such as, for example, the transaction amount, the currency and/or the country in which the transaction is performed, prior to the generation of the barcode(s). The transaction information may be embedded in the barcode and used in the generation of a cryptogram.

The user device and the merchant device used in the claimed disclosure may be any form of electronic device, but the claimed disclosure has particular utility for mobile computing devices such as smart phones, and relevance to applications such as mobile banking.

General and specific embodiments of the disclosure will be described below with reference to the Figures.

Figure 15:
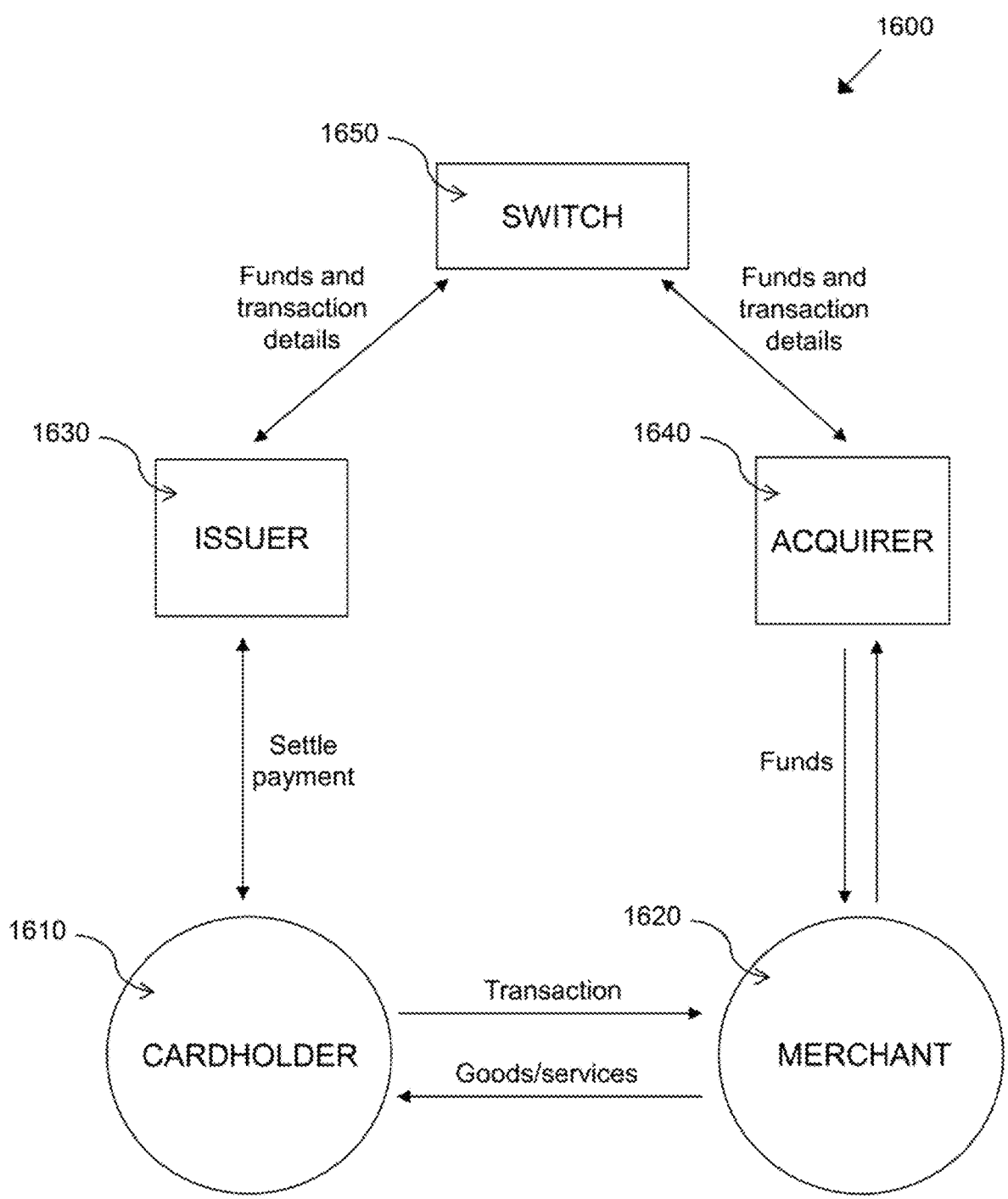
FIG. 15 illustrates a typical four-party model used in payment interactions between entities operating in a card scheme.

FIG. 15 is a schematic block diagram of a typical four-party model or four-party payment transaction scheme. The diagram illustrates the entities present in the model and the interactions occurring between entities.

Normally, card schemes—payment networks linked to payment cards—are based on one of two models: a three-party model (adopted by American Express) or a four-party model (adopted by Visa and Mastercard). For the purposes of this document, the four-party model is described in further detail below.

The four-party model may be used as a basis for the transaction network. For each transaction, the model comprises four entity types: cardholder 1610, merchant 1620, issuer 1630 and acquirer 1640. In this model, the cardholder 1610 purchases goods or services from the merchant 1620. The issuer 1630 is the bank or any other financial institution that issued the card to the cardholder 1610. The acquirer 1640 provides services for card processing to the merchant 1620.

The model also comprises a central switch 1650—interactions between the issuer 1630 and the acquirer 1640 are routed via the switch 1650. The switch 1650 enables a merchant 1620 associated with one particular bank (acquirer 1640) to accept payment transactions from a cardholder 1610 associated with a different bank (issuer 1630).

A typical transaction between the entities in the four-party model can be divided into two main stages: authorization and settlement. The cardholder 1610 initiates a purchase of a good or service from the merchant 1620 using their card. Details of the card and the transaction are sent to the issuer 1630 via the acquirer 1640 and the switch 1650 to authorize the transaction. Should the transaction be considered abnormal by the issuer 1630, the cardholder 1610 may be required to undergo a verification process to verify their identity and the details of the transaction. Once the verification process is complete the transaction is authorized.

On completion of the transaction between the cardholder 1610 and the merchant 1620, the transaction details are submitted by the merchant 1620 to the acquirer 1640 for settlement.

The transaction details are then routed to the relevant issuer 1630 by the acquirer 1640 via the switch 1650. Upon receipt of these transaction details, the issuer 1630 provides the settlement funds to the switch 1650, which in turn forwards these funds to the merchant 1620 via the acquirer 1640.

Separately, the issuer 1630 and the cardholder 1610 settle the payment amount between them. In return, a service fee is paid to the acquirer 1640 by the merchant 1620 for each transaction, and an interchange fee is paid to the issuer 1630 by the acquirer 1640 in return for the settlement of funds.

Figure 1:
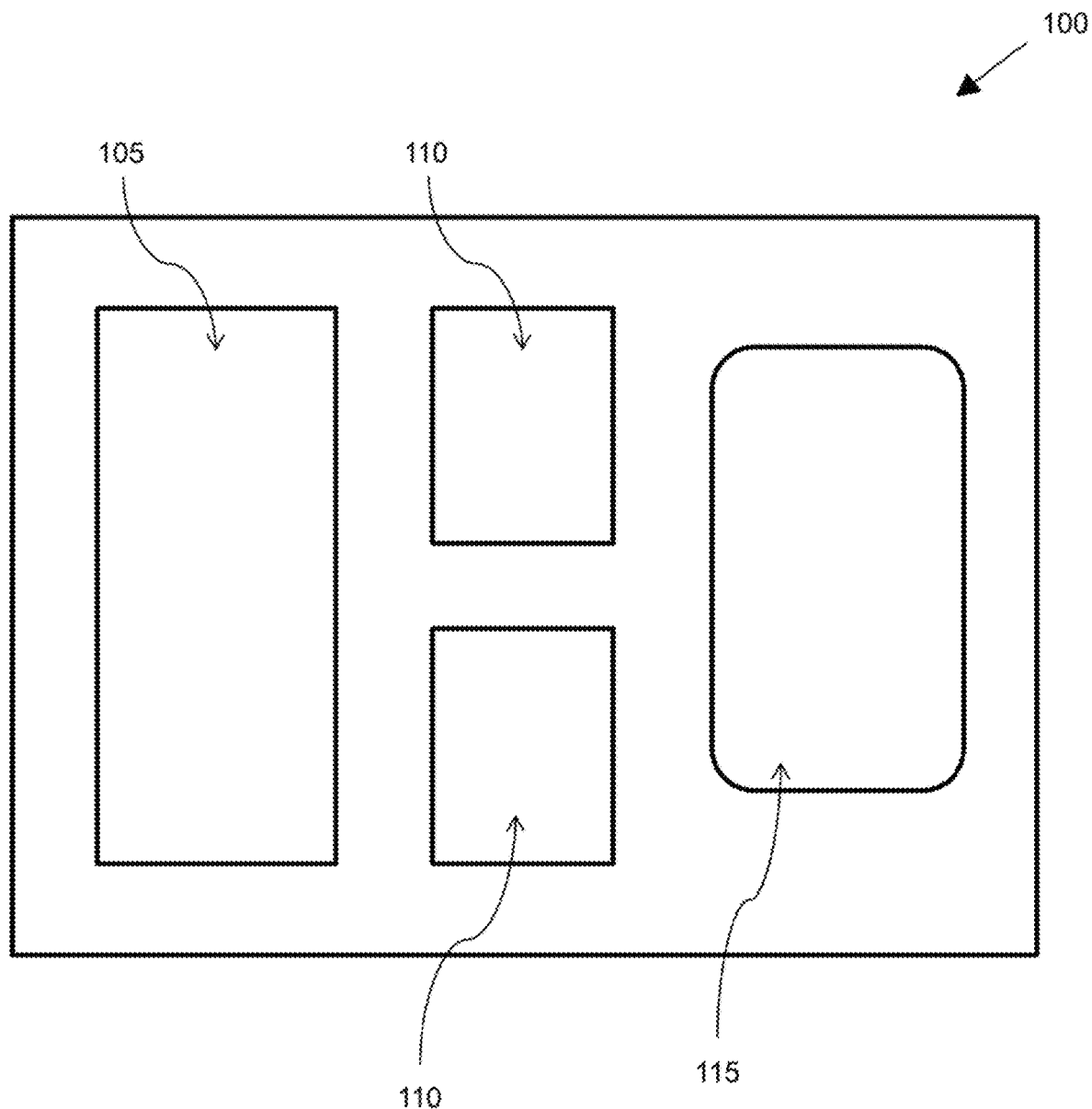
FIG. 1 illustrates schematically the relevant components of an electronic wallet platform for enabling electronic payment transfers in accordance with an embodiment of the disclosure.

FIG. 1 illustrates schematically the relevant components of an electronic wallet (e-wallet) platform 100 for enabling electronic payment transfers in accordance with an embodiment of the disclosure. The e-wallet platform comprises three main components, namely an e-wallet service provider 105 (e.g. a payment network provider such as Mastercard or a mobile network operator), an electronic device 115 (e.g. a mobile computing device such as a smart phone), and an e-wallet software application 135 or customer application installed on the electronic device (e.g. Masterpass or Android Pay). The e-wallet platform 100 also comprises one or more networks 110 to enable the transfer of data between the service provider 105 and the electronic device 115, as well as the payer, the payee and their respective banks. A user of the electronic device can use the combination of components in the e-wallet platform to make and receive payment transactions.

Figure 2:
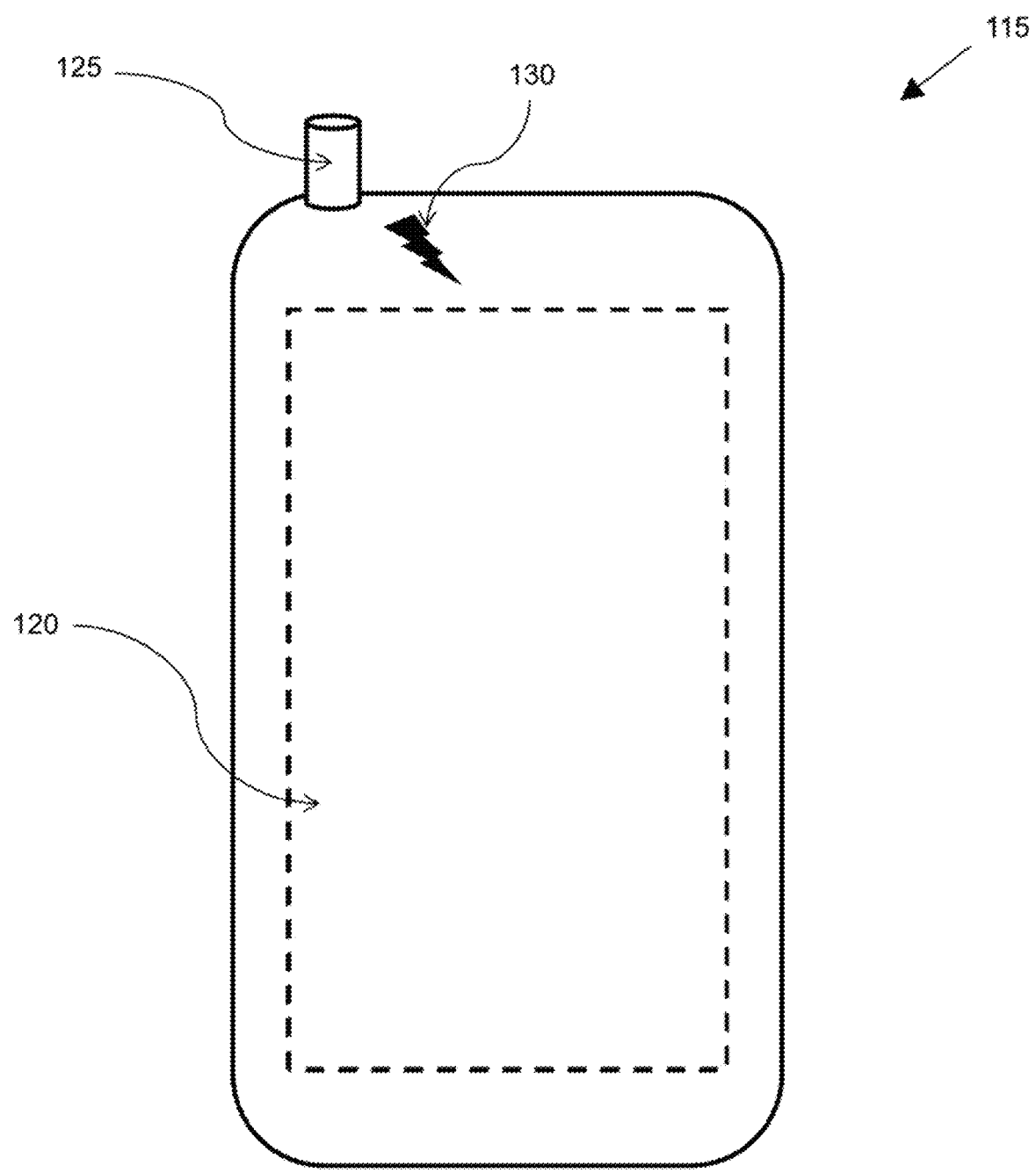
FIG. 2 shows schematically the relevant parts of the exemplary hardware architecture for a mobile computing device suitable for implementing an embodiment of the disclosure.

FIG. 2 shows schematically the relevant parts of the exemplary hardware architecture for a mobile computing device 115 suitable for implementing an embodiment of the disclosure. In the example shown, the mobile computing device is a mobile cellular telecommunications handset ("mobile phone" or "mobile device")—in other embodiments, the computing device may be another type of computing device such as a laptop computer or a tablet and the computing device need not have cellular telecommunications capabilities. The mobile phone 115 has a display 120 providing, in this example, a touchscreen user interface. The mobile phone 115 is equipped with a wireless telecommunications apparatus 125 for communication with a wireless telecommunications network and local wireless communication apparatus 130.

Figure 3:
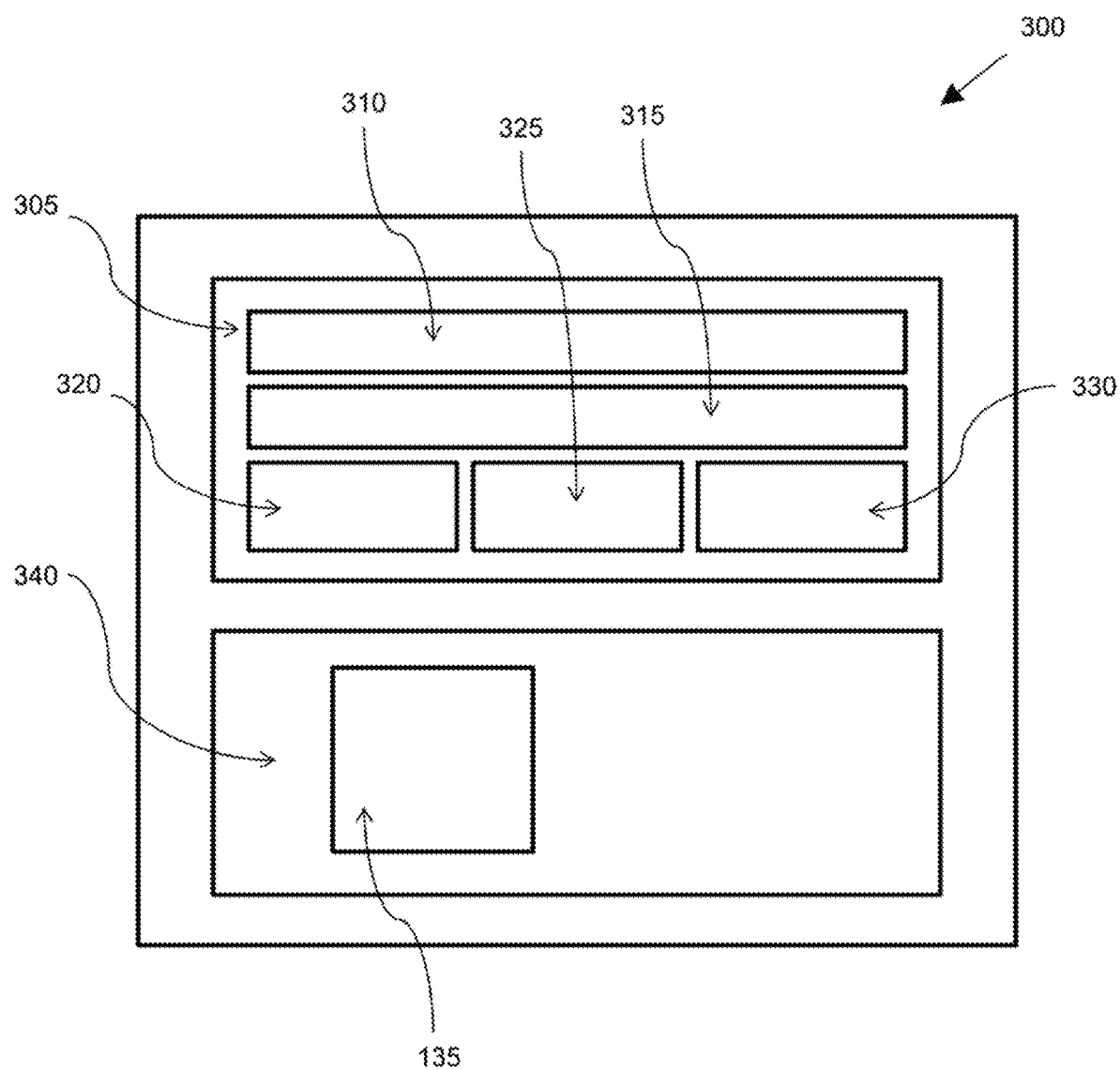
FIG. 3 illustrates the software architecture of a mobile computing device, in accordance with an embodiment of the disclosure.

FIG. 3 illustrates the software architecture 300 of a mobile computing device 115, in accordance with an embodiment of the disclosure. In FIG. 3, a main operating environment 305 of the mobile computing device is shown along with a protected operating environment 340. The protected operating environment 340 may be a Subscriber Identity Module (SIM), Universal Integrated Circuit Card (UICC), a Secure Element or a hardware backed Trusted Execution Environment. Alternatively, there may be a sandbox or other logically protected environment in the main operating environment to provide a secure environment.

The main operating environment 305 comprises an application processor 310 and associated memories 315. The main operating environment may be used with a generic operating system (such as iOS or Android). The main operating environment also comprises other applications normally needed by such a mobile computing device, such as a browser 320, a modem 325 and a camera driver 330.

The protected operating environment 340 may comprise an e-wallet software application 135. Alternatively, the elements relevant to the security of the e-wallet software application may be comprised in the protected operating environment. In FIG. 3, an e-wallet software application 135 is shown explicitly in the protected operating environment 340. The application may be located within the SIM 305 or within another physically or logically protected environment. Alternatively, some parts of the mobile payment application may be situated in the protected operating environment. Further, data from the application may be located in a protected memory.

Figure 4:
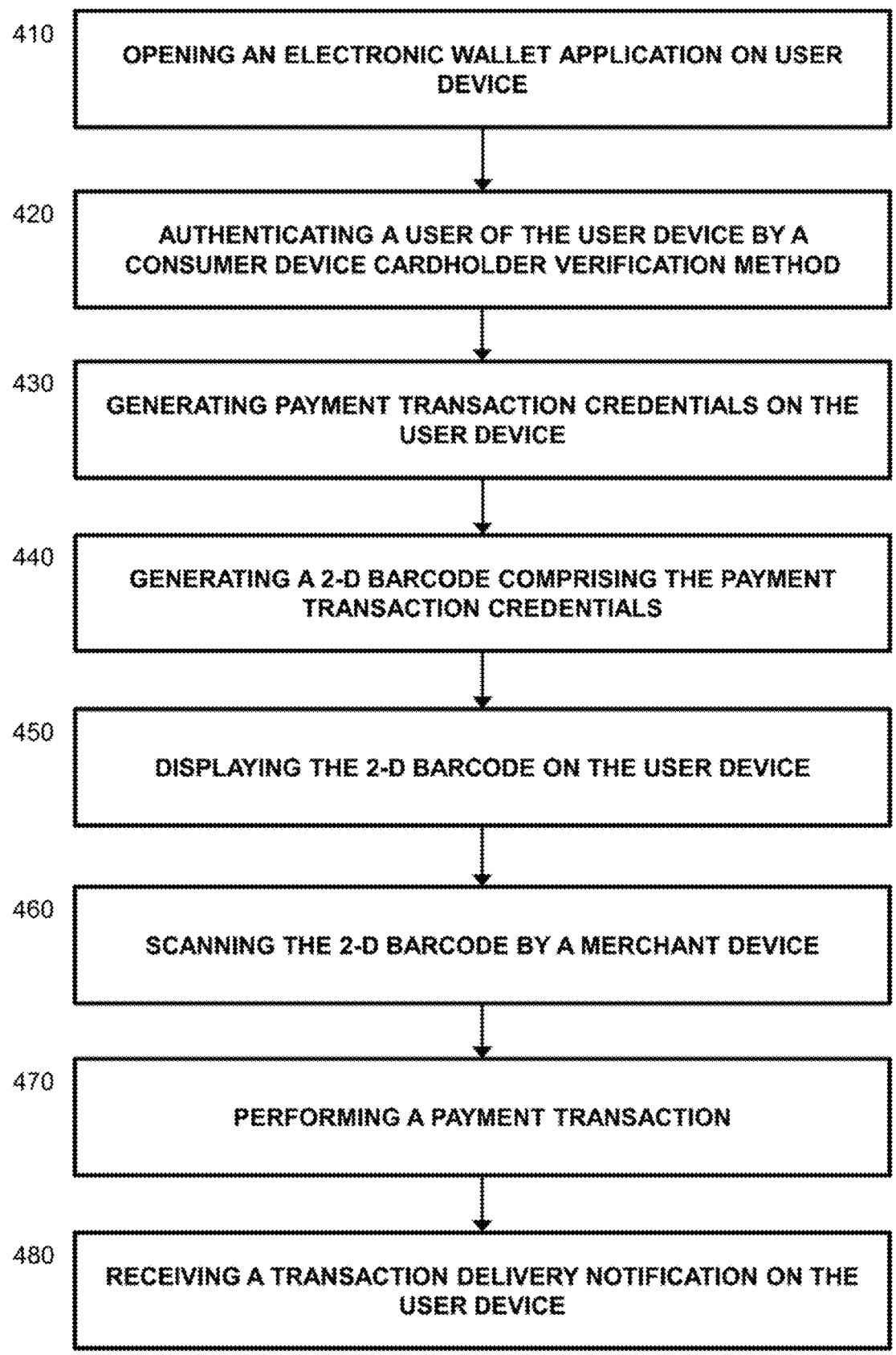
FIG. 4 illustrates schematically method steps in a general embodiment of the disclosure.

FIG. 4 illustrates schematically method steps in a general embodiment of the disclosure for authenticating and performing a transaction on a user device. First of all, the method comprises opening 410 an e-wallet application on a user device. The described embodiments are applicable to any form of e-wallet, also known as a digital wallet or a mobile wallet, and may be implemented using various electronic devices, such as tablets, desktop computers, laptop computers as well as mobile phones. After opening the e-wallet application, the user is authenticated 420 by a consumer device cardholder verification method. This provides the assurance that the correct cardholder is performing the transaction. A consumer device cardholder verification method (CDCVM) is a method of cardholder verification in which the credentials associated with the user are entered directly into the user device and not via a merchant device. Such consumer device cardholder verification methods may include a personal identification number (PIN), a password, biometric authentication mechanisms such as a fingerprint or an iris scan. Once the user has been authenticated, the user is able to initiate a payment transaction via the e-wallet application user interface in order to purchase goods or services. Payment transaction credentials are generated 430. Prior to processing the transaction, the method may ensure that no other contactless transaction is performed simultaneously. Alternatively, the payment transaction credentials may be authenticated by the merchant by putting an asymmetric cryptogram (EMV CDA—combined data authentication) in the QR code, for example using an Elliptic Curve version of CDA.

The next step of the method is generating 440 a barcode comprising the payment transaction credentials. The method may generate a one-dimensional (1-D) barcode, a two-dimensional (2-D) barcode, or both a 1-D barcode and a 2-D barcode at the same time. Advantageously, if a merchant is unable to scan the 2-D barcode, for example, due to barcode scanner limitations, they can attempt to scan the 1-D barcode to process the transaction. First, the transaction information and terminal information may be retrieved and queried to determine whether or not the transaction is allowed. The user device may receive the transaction information and terminal information out-of-band, before the generation of the barcodes, which would avoid any need for manual entry of this information by the user.

Dynamic magstripe data (DMSD) and EMV data may be generated simultaneously by the e-wallet application. DMSD, which in turn comprises a cryptogram calculated based on a time stamp, is provided in the 1-D barcode, whereas both DMSD and EMV data are provided in the 2-D barcode. An advantage of providing both types of transaction data in the 2-D barcode is that if a merchant is able to scan a 2-D barcode but is unable to perform an EMV transaction, for example, due to network limitation, the merchant can attempt to perform a DMSD transaction by scanning the 2-D barcode. A DMSD transaction provides a higher level of security than using static track data. In the example in FIG. 4, the method focuses on generating a 2-D barcode comprising the payment transaction credentials and displaying the 2-D barcode on the user device.

As described above, both DMSD and EMV data are generated and provided in the 2-D barcode. For the generation of EMV data, the method returns one or more unpredictable numbers for the transaction, given the date and time. An unpredictable number is a value created for each transaction to provide variability and uniqueness to the generation of a cryptogram. The purpose of an unpredictable number is mainly to ensure that the data is "fresh". In other words, to provide some confidence that it was generated at the time of the transaction and in conjunction with the POI at which the transaction is performed. Because barcode technologies are unidirectional the usual process as described in EMV of getting a value from the terminal and including it in the device's calculation of a cryptogram subsequently returned to the POI is not easy to do.

Whilst another solution such as scanning a barcode from the terminal and subsequently generating a barcode for the terminal might be performed, or using a handover to another technology, or using a parallel comms channel such as modulated light or sound may provide such a channel, a simpler solution that is more reliable for the participants is adopted in DMSD generation. For the generation of DMSD, the method encodes time in lieu of the unpredictable number. The method then carries out a cryptogram calculation, based on the obfuscated time procedure, which may be carried in Track 2 data.

The method then returns a structure comprising two sets of formatted transaction data: one set according to EMV-QRC; and the other according to DMSD. The returned structure may also comprise a Transaction ID specific to the barcode. The Transaction ID may be used to reconcile the payment with the transaction details. The returned structure is then used in the generation of a 2-D barcode.

Once generated, the 2-D barcode is displayed 450 on the user device to be scanned 460 by a merchant device. The user may receive a notification with the payment transaction credentials at the user device to enable the user to corroborate the payment transaction. A payment transaction is then performed 470. The final step is receiving 480 a transaction delivery notification on the user device.

Figure 5:
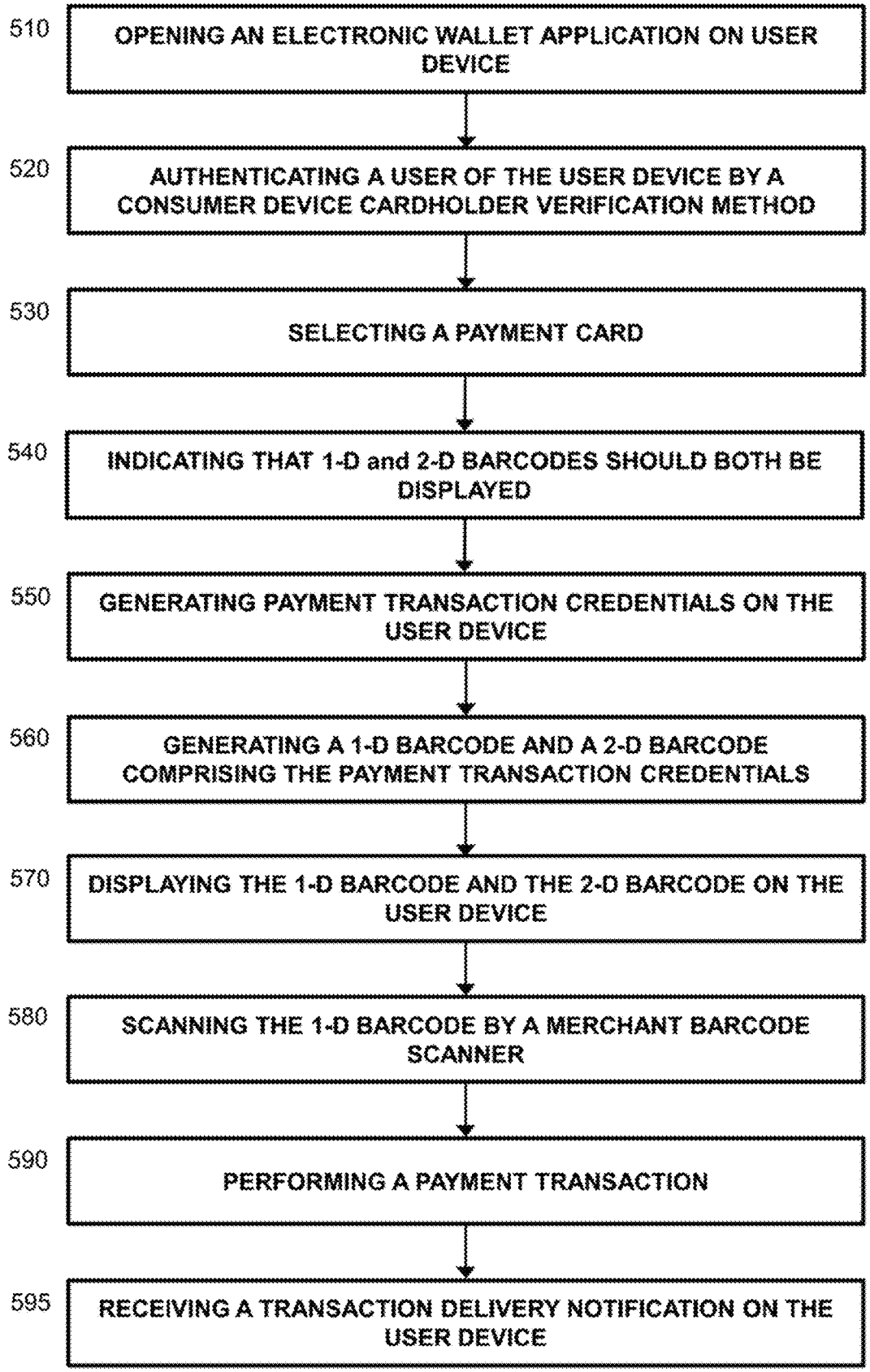
FIG. 5 illustrates schematically method steps in a first embodiment of the disclosure.

FIG. 5 illustrates schematically method steps in a first embodiment of the disclosure. The first step in this embodiment is opening 510 an e-wallet application on a user device. After opening the e-wallet application, there is an authentication step to authenticate 520 the user by a consumer device cardholder verification method. In the e-wallet, the user is prompted to select 530 a payment card to be used for the payment transaction.

There is configurable information in the e-wallet to indicate whether only a 2-D barcode should be returned by the method or whether both a 1-D barcode and a 2-D barcode should be returned by the method. While use of a 2-D barcode will generally be preferred if supported by all parties as a 2-D barcode can carry a significant amount of information allowing a full transaction protocol to be used, some parties may only support 1-D barcode scanning. In these cases a 1-D solution may be used. Once a payment card has been selected and the barcode type has been indicated 540, the e-wallet generates 550 payment transaction credentials on the user device.

The next step of the method is generating the barcode(s) comprising the payment transaction credentials. First, the transaction information may be retrieved and queried to determine whether or not the transaction is allowed.

In the present embodiment, the user is indicating 540 that 1-D and 2-D barcodes should both be displayed on the screen of the user device. DMSD and EMV data is generated simultaneously by the e-wallet application. DMSD, which in turn comprises a cryptogram calculated based on a time stamp, is provided in the 1-D barcode, whereas both DMSD and EMV data are provided in the 2-D barcode.

For the generation of EMV data, the method returns one or more unpredictable numbers for the transaction, given the date and time. For the generation of DMSD, the method encodes time in lieu of the unpredictable number. The method then carries out a cryptogram calculation, based on the obfuscated time procedure, which may be carried in Track 2 data.

The method then returns a structure comprising two sets of formatted transaction data: one set according to EMV-QRC which is used in the generation of a 2-D barcode; and the other according to DMSD which is provided in both the 1-D barcode and the 2-D barcodes. The Transaction ID may be used to reconcile the payment with the transaction details. This structure is then used in the generation of a 2-D barcode.

Next, a 1-D barcode and a 2-D barcode are both displayed 570 on the screen of the user device. In this example, the merchant is equipped with a 1-D barcode scanner but is not able to scan 2-D barcodes. The merchant, therefore, scans 580 the 1-D barcode with the 1-D barcode scanner.

Following the scanning of the barcode, a payment transaction is performed 590. The final step is receiving 595 a transaction delivery notification on the user device.

The present disclosure enables two ways of conveying payment data, each providing a different level of security. It is advantageous from the perspective of acceptance coverage for the merchant to be able to select whether to scan a 1-D barcode or a 2-D barcode depending on the type of barcode scanner available to the merchant at the time. Merchants who have a 1-D barcode scanner would be unable to scan a 2-D barcode however they would be able to scan the 1-D barcode instead and proceed to perform a transaction. In addition, in the event that the 2-D barcode fails to scan, the 1-D barcode may be used to perform the payment transaction.

Figure 6:
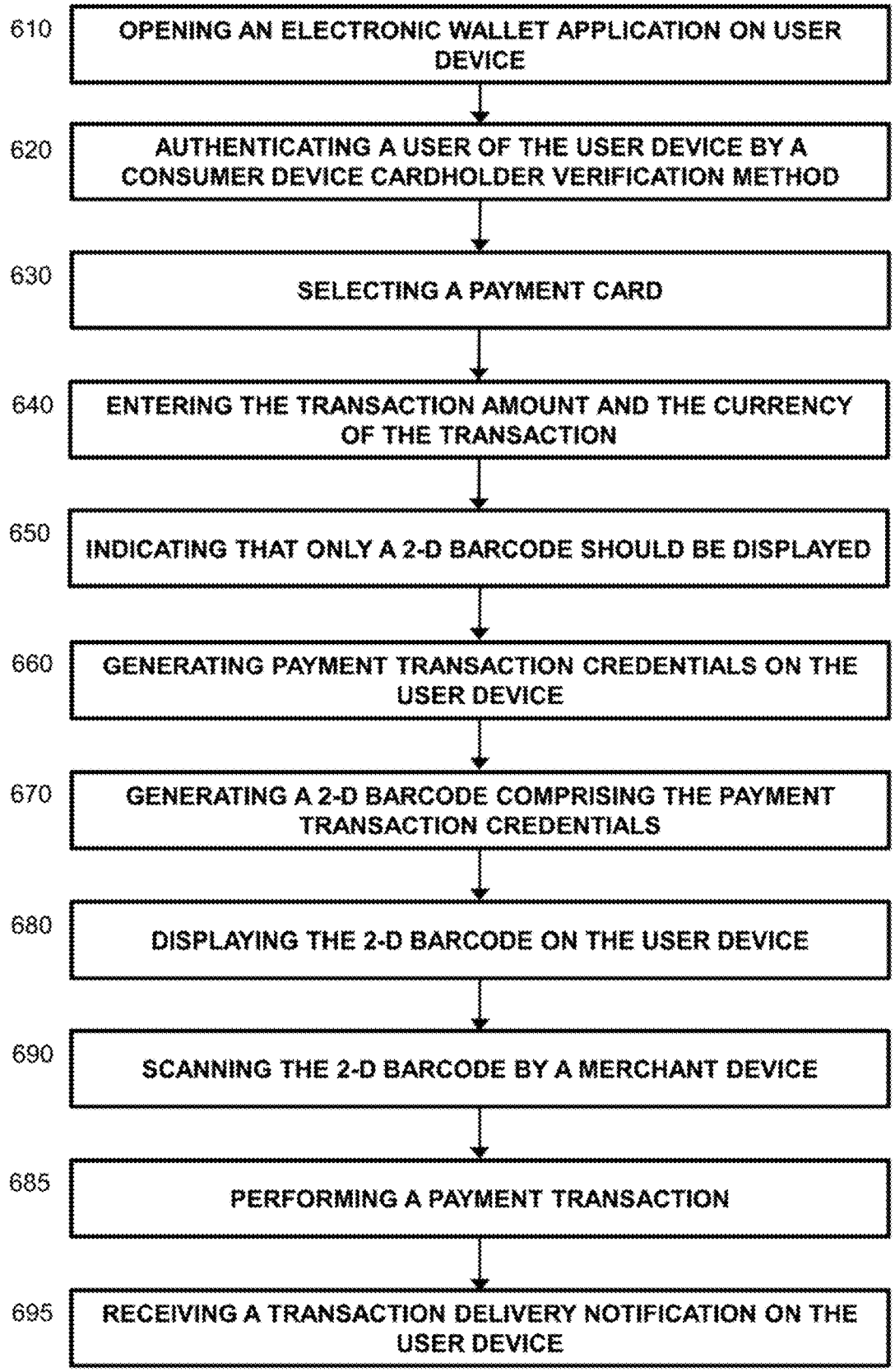
FIG. 6 illustrates schematically method steps in a second embodiment of the disclosure.

FIG. 6 illustrates schematically method steps in a second embodiment of the disclosure. The first three steps—namely, 610, 620 and 630—are equivalent to the first three steps of the first embodiment described in FIG. 5. These first three steps involve opening 610 an e-wallet application, authenticating 620 the user, and selecting 630 a payment card to be used for the payment transaction.

The user may then be prompted to enter 640 payment transaction credentials such as, for example, the transaction amount and/or the currency of the transaction. In some cases the user may enter the transaction amount but may not enter the currency of the transaction; in this case the currency code may be set to null. The format of the inputted credentials may then be validated.

The user may also be prompted to indicate whether only a 2-D barcode should be returned by the method or whether both a 1-D barcode and a 2-D barcode should be returned by the method. Once a payment card has been selected, the transaction credentials entered 640, and the barcode type indicated 650, the e-wallet generates 660 payment transaction credentials on the user device.

The next step of the method is generating the barcode(s) comprising the payment transaction credentials. First, the transaction information may be retrieved and queried to determine whether or not the transaction is allowed. Given the system date and time, the method may return one or more unpredictable numbers for a transaction.

In the present embodiment, the user is indicating 650 that only a 2-D barcode should be displayed on the screen of the user device. In this example, within the method step of generating 670 a 2-D barcode comprising the payment transaction credentials, an unpredictable number for an EMV-QRC transaction is returned. This unpredictable number is used in the calculation of an application cryptogram. The method then returns a structure comprising a single set of formatted transaction data according to EMV-QRC which allows the generation of a 2-D barcode.

When generating a barcode, errors may be encountered if, for example: one or more input parameter has an incorrect format; the transaction is declined due to the user not being authenticated or another reason; there are no payment transaction credentials available for the transaction; or an error is encountered during cryptographic operations.

Next, a 2-D barcode is displayed 680 on the screen of the user device. In this example, a merchant device is able to scan 690 the 2-D barcode. Following the scanning of the barcode, a payment transaction is performed 685 and a transaction delivery notification is received 695 by the user device upon successful completion of the transaction.

Figure 7:
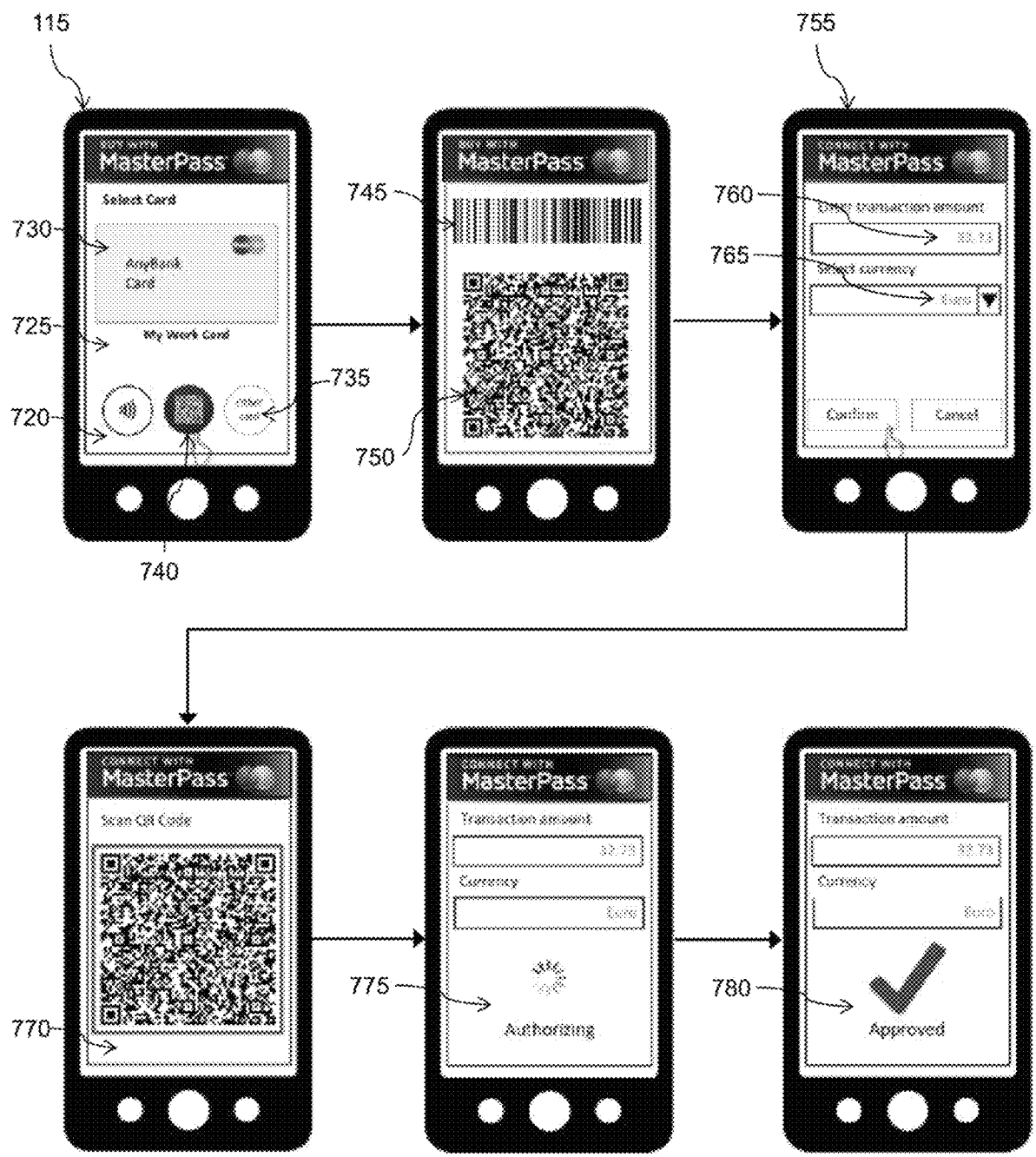
FIG. 7 illustrates a mobile device adapted for authenticating and performing a transaction in accordance with a third embodiment of the disclosure.

FIG. 7 illustrates a mobile device 115 adapted for authenticating and performing a transaction in accordance with a third embodiment of the disclosure. This embodiment is described with reference to an e-wallet application 720, such as, for example, Masterpass, which may be installed on a mobile device 115. The e-wallet application 720 is the e-wallet application component of an e-wallet platform for enabling electronic payment transfers on an electronic device wherein the payment network provider is Mastercard. The user of the mobile device can use the combination of components in the e-wallet platform to make and receive payment transactions.

Firstly, the e-wallet application 720 may be opened and displayed on a screen of the device 115 by a user. Once the application is opened, the user may be presented with a payment card selection page 725 on which one or more payment cards 730 such as, for example, credit or debit cards that can be used to make a payment transaction may be displayed. The user may also be presented with an option to select a card that is not currently displayed on the payment card selection page 725. This option may be accessible through an "Other card" icon 735 on the screen. The user may then be prompted to select a payment card to be used for the payment transaction. The user may respond by either selecting a payment card 730 on the payment card selection page 725 or a different payment card through the "Other card" icon 730. The user may then indicate, via a barcode indication icon 740, that both a 1-D barcode and a 2-D barcode should be returned by the application and displayed on the screen.

Once a payment card has been selected and the barcode type has been indicated, the e-wallet may generate payment transaction credentials and generate the barcodes comprising the payment transaction credentials. A 1-D barcode 745 and a 2-D barcode 750 are then both displayed on the screen.

Payment transaction credentials such as, for example, the transaction amount 760 and the currency 765 of the transaction may be entered into a merchant POS application on a merchant device 755. As another option, the user may enter the payment transaction credentials before the barcodes are generated.

In this case, the merchant device is capable of scanning 2-D barcodes. The 2-D barcode is scanned 770 by the merchant device and, subsequently, the transaction is performed 775. Once the transaction has been performed successfully, a transaction delivery notification 780 is displayed on the mobile device.

Figure 8:
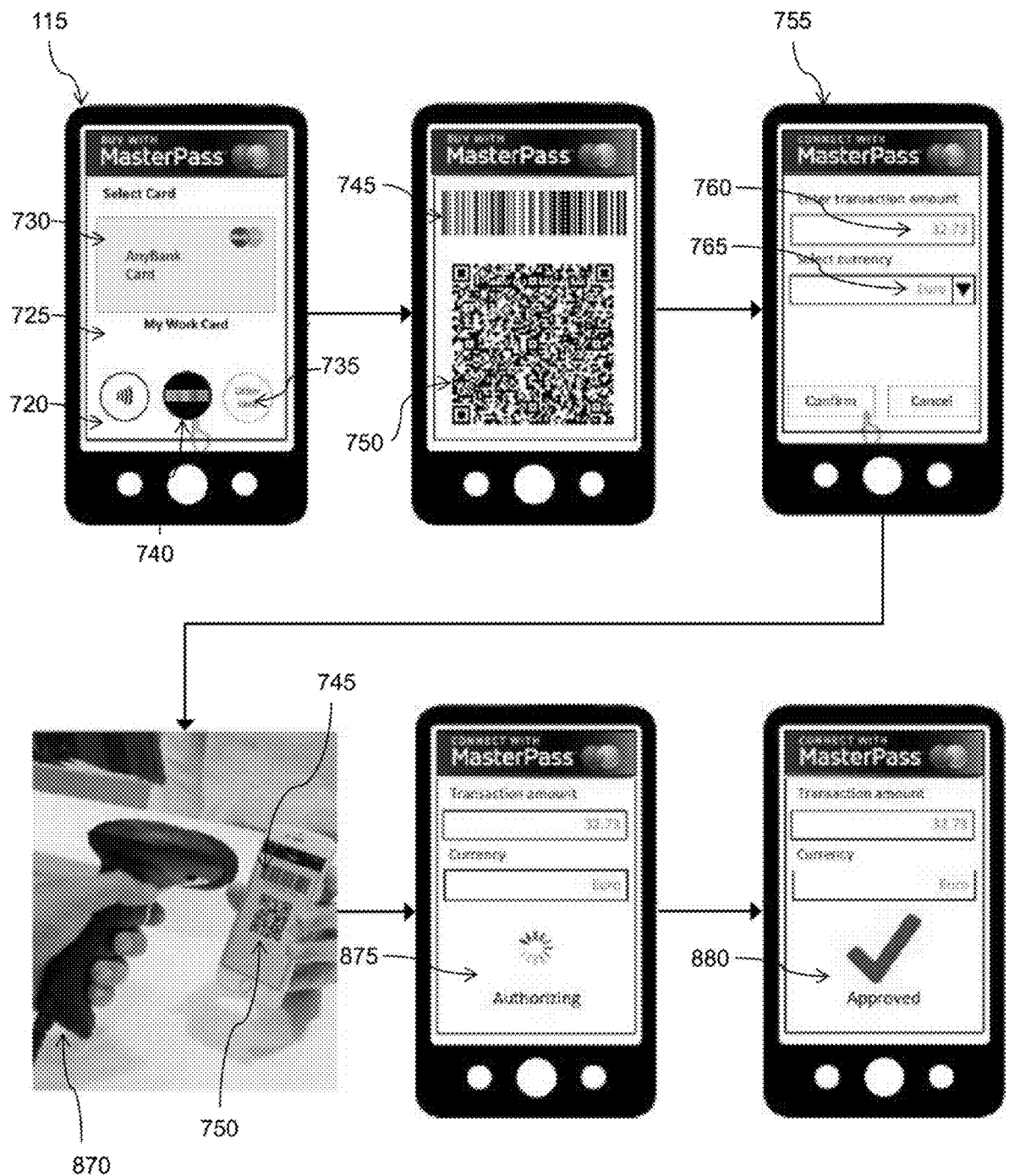
FIG. 8 illustrates a mobile device adapted for authenticating and performing a transaction in accordance with a fourth embodiment of the disclosure.

FIG. 8 illustrates a mobile device 115 adapted for authenticating and performing a transaction in accordance with a fourth embodiment of the disclosure.

The e-wallet application 720 may be opened and displayed on a screen of the device 115 by a user. Once the application is opened, the user may be presented with a payment card selection page 725 on which one or more payment cards 730 such as, for example, credit or debit cards that can be used to make a payment transaction may be displayed. The user may also be presented with an option to select a card that is not currently displayed on the payment card selection page 725. This option may be accessible through an "Other card" icon 735 on the screen. The user may then be prompted to select a payment card to be used for the payment transaction. The user may respond by either selecting a payment card 730 on the payment card selection page 725 or a different payment card through the "Other card" icon 735. The user may then then indicate, via a barcode indication icon 740, that both a 1-D barcode and a 2-D barcode should be returned by the application and displayed on the screen.

Once a payment card has been selected and the barcode type has been indicated, the e-wallet may generate payment transaction credentials and generate the barcodes comprising the payment transaction credentials. A 1-D barcode 745 and a 2-D barcode 750 are then both displayed on the screen.

Payment transaction information such as, for example, the transaction amount 760 and the currency 765 of the transaction are entered into a merchant POS application on a merchant device 755. As another option, the user may enter the payment transaction credentials before the barcodes are generated.

In this case, the merchant device is not capable of scanning 2-D barcodes. Instead, the merchant is equipped with a 1-D barcode scanner 870. The merchant, therefore, scans the 1-D barcode 745 with the 1-D barcode scanner 870.

Subsequently, the transaction is performed 875. Once the transaction has been performed successfully, a transaction delivery notification 880 is displayed on the mobile device.

Figure 9:
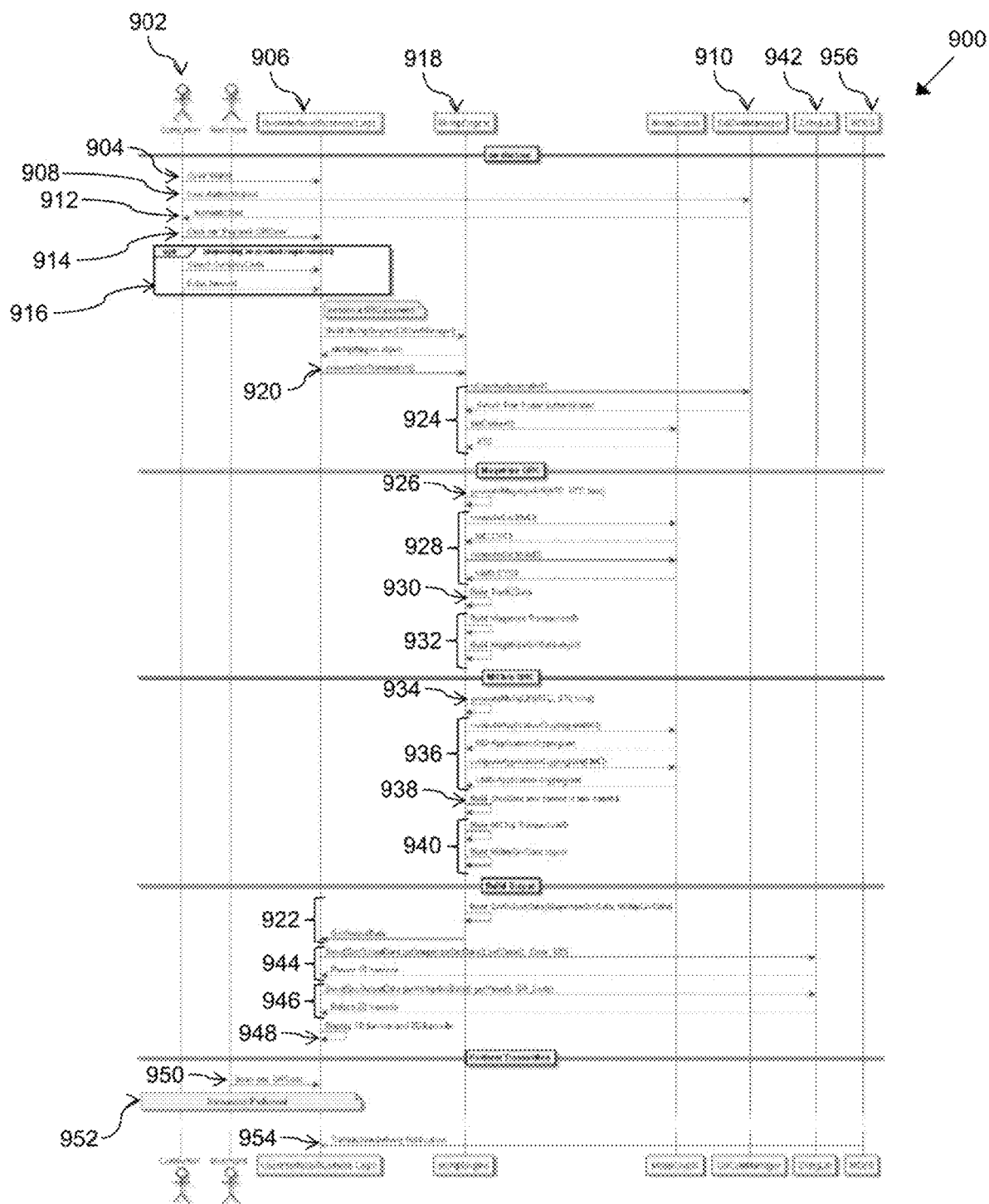
FIG. 9 shows a sequence diagram for authenticating and performing a transaction on a user device in accordance with an embodiment of the disclosure.

FIG. 9 shows a sequence diagram for authenticating and performing a transaction on a user device in accordance with an embodiment of the disclosure. FIG. 9 illustrates an exemplary embodiment of the general embodiment discussed in FIG. 4.

This embodiment is described with reference to a payment transaction performed with a payment from a consumer to a merchant. Exemplary classes that may be used for performing the transaction using MasterPass are described below.

First, the consumer 902 opens 904 the e-wallet application which appears on the user interface 906 of the consumer's mobile device. After opening e-wallet, the consumer is verified by a consumer device cardholder verification method (CDCVM). A user authentication request 908 is submitted to a CDCVM Manager 910. The consumer is informed once they have been authenticated 912 successfully.

The consumer 902 then initiates a payment transaction by selecting an icon termed "Pay with QRCode" 914 on the user interface of the mobile device. Optionally, the consumer may enter the transaction amount and/or the currency of the transaction 916 via the user interface 906.

A class named MchipEngine 918 comprises a method called processQrcTransaction 920. The method processQrcTransaction 920 takes an entity class, QrcInputData, and returns an entity class, QrcOutputData 922, comprising formatted data to generate a QRC, as well as a Transaction ID specific to each barcode.

When the method processQrcTransaction 920 is processed, MchipEngine 918 may perform a format check 924 of the input data provided in the QrcInputData structure. Next, the transaction information and terminal information may be retrieved and queried to determine whether or not the transaction is allowed. If the transaction is allowed, the QrcOutputData 922 structure is built and returned. QrcOutputData 922 comprises EMV-QRC (M/Chip) data and optionally Dynamic Magstripe Data.

The QrcInputData structure may, for example, comprise the amount of the transaction, the currency of the transaction, and/or the country code of the transaction 916. Prior to processing a QRC transaction, MchipEngine 918 may ensure that no contactless transaction is being performed simultaneously.

MagstripeQrc is a class responsible for providing dynamic Magstripe data. The method generateMagstripeUN( ) 926 returns an unpredictable number for a Magstripe QRC transaction, given the system date and time. Using a byte array representing the generated unpredictable number and a parameter of type KeyType, the method computeCvc3 928 computes and returns a card verification code (CVC3) cryptogram.

CVC3 is a type of card security code used for the purpose of minimising fraud in payment card transactions when the card is not physically present. The code is a three or more digit number that is a dynamic variant of the one that appears at the back of the card CVC1). CVC3 is calculated at each contactless or QRC magstripe transaction. The card security code may also be known as, for example, the card verification data (CVD), card verification value (CVV) or signature panel code (SPC).

The formatted Track 2 data is then returned 930, which contains Dynamic CVC3. MagstripeQrc then builds the object MagstripeQrcData 932 which comprises dynamic Magstripe data and optionally a Transaction ID for the present transaction.

MchipQrc is a class responsible for providing input data to allow the terminal to build formatted transaction data according to EMV-CPS which allows the generation of a 2-D barcode. MchipQrc may also retrieve a Transaction ID for the present transaction.

The method generateMchipUN( ) 934 returns an unpredictable number for an M/Chip QRC transaction given access to the system date and time. Using a byte array representing the generated unpredictable number and a parameter of type KeyType, the method computeApplicationCryptogram 936 computes and returns an application cryptogram. Chip data is then returned and converted into an appropriate encoding scheme, in this case Base64 938. MchipQrc then builds the object MchipQrcData 940 which comprises EMV-QRC (M/Chip) data and optionally a Transaction ID for the present transaction.

The QrcOutputData 922 structure is built and returned. In this example, QrcOutputData 922 comprises both EMV-QRC (M/Chip) data (in MchipQrcData) and Dynamic Magstripe Data (in MagstripeQrcData). The data is then sent to a library that generates barcodes 942 for code generation. For 1-D barcode generation, the MagstripeQrcData component of QrcOutputData 922 is sent to a library that generates barcodes 942, which then returns a 1-D barcode 944. For 2-D barcode generation, the MchipQrcData component of QrcOutputData 922 is sent to a library that generates barcodes 942, which then returns a 2-D barcode 946. Both the 1-D barcode and the 2-D barcode are then displayed 948 in the user interface 906.

Either the 1-D barcode or the 2-D barcode may be scanned 950 by a merchant device—a decision that would depend on the type of device available to the merchant and the type of barcode that may be scanned by the available merchant device. A payment transaction is then performed 952. Once the application has been performed, a transaction delivery notification 954 is sent from the MasterCard Digital Enablement Service (MDES) 956, which corresponds to the MasterCard digitisation and tokenisation platform, to the user interface 906.

Figure 10:
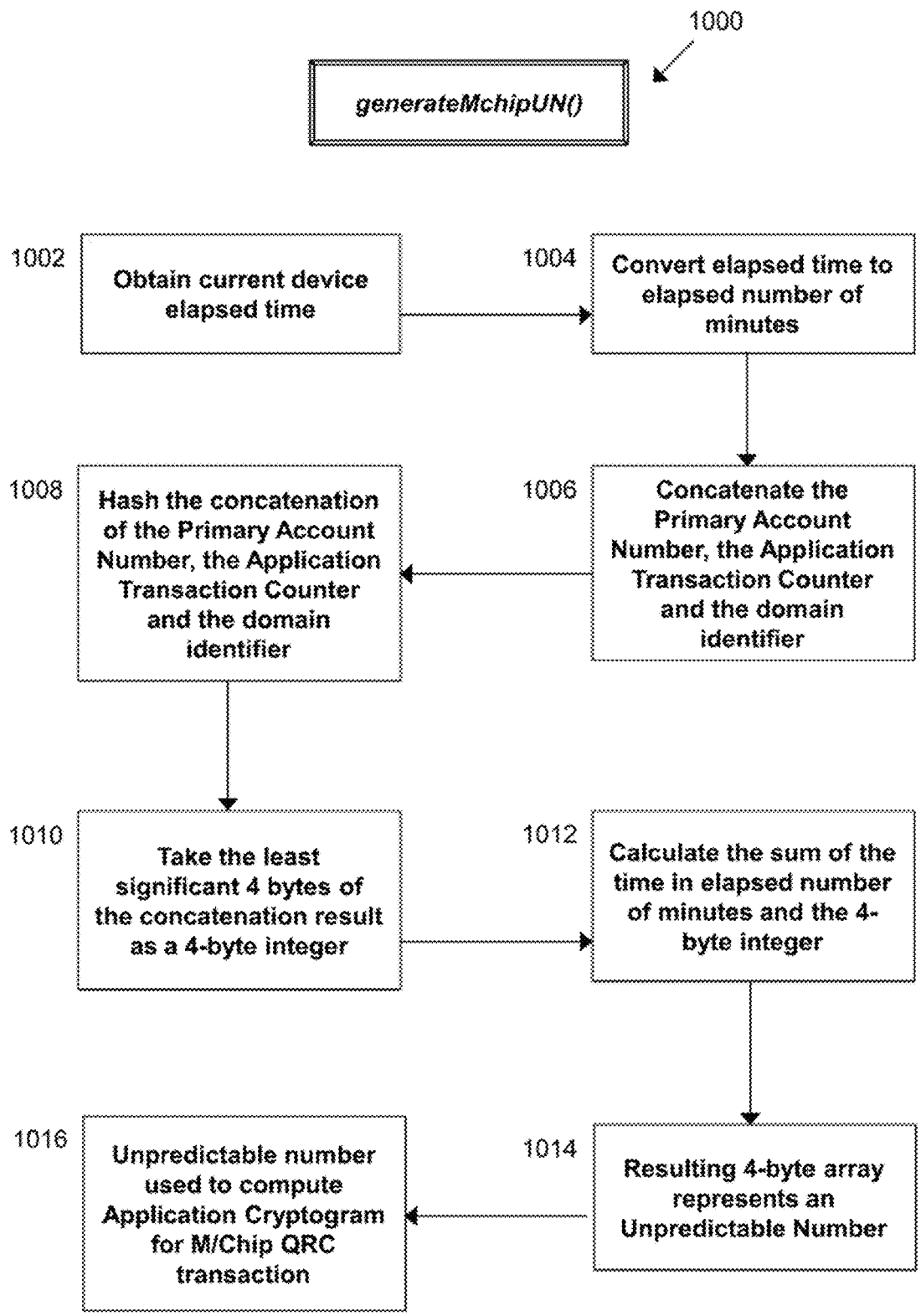
FIG. 10 illustrates the method generateMchipUN( ) for returning an unpredictable number for an M/Chip QRC transaction in accordance with an embodiment of the disclosure.

FIG. 10 illustrates the method generateMchipUN( ) for returning an unpredictable number for an M/Chip QRC transaction in accordance with an exemplary embodiment of the disclosure.

The method generateMchipUN( ) 1000 must be able to access the system date and time. The time may be the number of minutes since a starting point of the system. In order to mask the time value and make it transaction specific, it is obfuscated.

An example of the method generateMchipUN( ) in use will now be described with reference to FIG. 10. First, the current device time as elapsed time since a defined starting point is obtained 1002. This time is then converted 1004 into the elapsed number of minutes. Next, a Primary Account Number (PAN), an Application Transaction Counter (ATC) and a domain identifier are concatenated 1006 and hashed 1008. The PAN is not the cardholder's real account number used by the issuer to fund the transaction but rather the tokenized value and taken as a compressed numeric value. The ATC is a sequential counter, usually internal to a chip application, that is maintained by the payment application. The ATC is incremented by the payment application each time the application is executed. The length of the ATC is normally 2 bytes. The domain identifier is a value provided to each program by Mastercard that consists of a variable number of bytes of data. The length of the domain identifier may be from zero bytes upwards.

Then, the least significant (rightmost) 4 bytes of the concatenation result is taken 1010 as an integer. Of this 4-byte integer, the least significant 8 bits would correspond to the last byte of the 4-byte integer. The sum 1012 of the time in elapsed number of minutes and the hashed 4-byte integer results in a 4-byte array that represents the unpredictable number 1014.

Thus, the output of the method generateMchipUN( ) 1000 is a byte array, consisting of 4 bytes, that is used as an unpredictable number 1014 in the calculation of the Application Cryptogram. The 4-byte array representing the unpredictable number is then used 1016 by the method computeApplicationCryptogram 936 to compute and return an Application Cryptogram for an M/Chip QRC transaction.

An M/Chip QRC transaction is based on a Digital Secure Remote Payment (DSRP) transaction with time in place of the unpredictable number and with the payment device generating the complete set of data to the terminal so that it may construct the authorization request.

Figure 11:
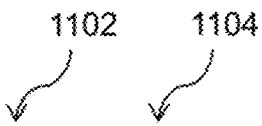
FIG. 11 illustrates the data elements used in the generation of the byte array for an M/Chip QRC transaction, in accordance with an embodiment of the disclosure.

FIG. 11 illustrates the data elements used in the generation of the byte array for an M/Chip QRC transaction, in accordance with an exemplary embodiment of the disclosure.

As described above, EMV-QRC (M/Chip) formatted transaction data enables the generation of a 2-D barcode. In order to build the M/Chip data, a byte array representing an unpredictable number is generated. The byte array may be generated by concatenating a Tag 1102 and a Value 1104 of the data elements shown in FIG. 11. Referring to FIG. 11, the Application Version Number has a value assigned by Mastercard and is used by Mastercard to indicate the format and content within the Application Specific Transparent Template.

Figure 12:
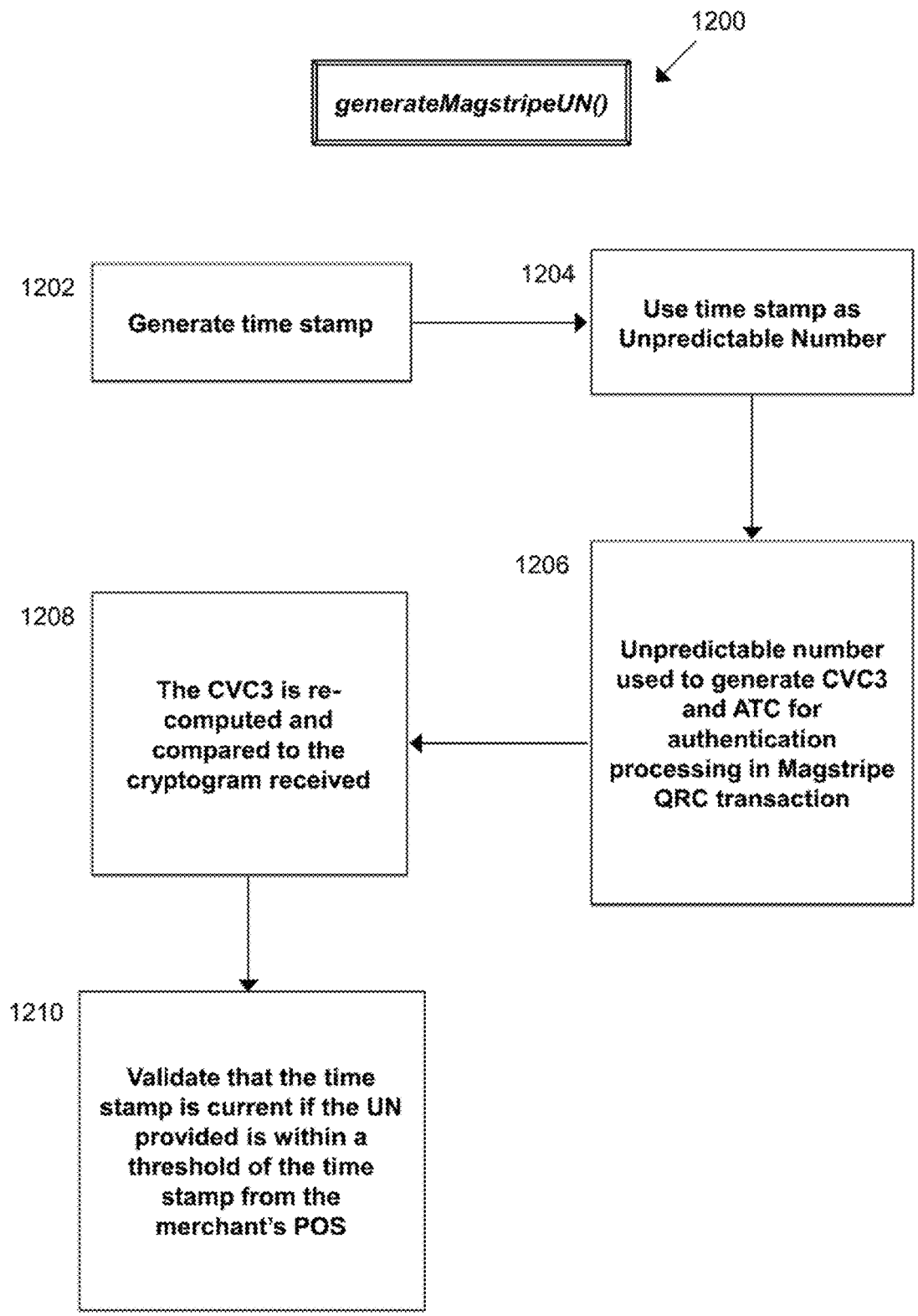
FIG. 12 illustrates the method generateMagstripeUN( ) for returning an unpredictable number for a Magstripe QRC transaction in accordance with an embodiment of the disclosure.

FIG. 12 illustrates the method generateMagstripeUN( ) for returning an unpredictable number for a Magstripe QRC transaction in accordance with an exemplary embodiment of the disclosure.

In the method generateMagstripeUN( ) 1200, a UN may be generated by the mobile device. The time value, or time stamp, generated by the mobile device may be used as the UN for the generation of the CVC3 cryptogram.

An example of the method generateMagstripeUN( ) 1200 in use will now be described with reference to FIG. 12.

First, a time stamp is generated 1202 by the mobile device at the time of a transaction. The time stamp may be a number based on the hour and/or minute and/or second and/or date of the transaction. This time stamp may be utilised 1204 as the UN for a transaction. The UN is utilized to generate 1206 the CVC3 and the ATC for use in authentication processing.

Upon receipt of the CVC3 value or cryptogram during authentication processing, the authentication system re-computes 1208 the CVC3 and compares it to the value received. If the UN provided by the mobile device is within a predetermined threshold amount or range of the time stamp provided by the merchant's POS terminal for the transaction, the authorization system validates 1210 that the time stamp is current.

The UN or time stamp is obfuscated and made transaction dependent so that a potential thief cannot easily observe or make use of the time value.

It should be noted that in some embodiments, the mobile device may be configured to generate a number for use as the UN that is not based on a time stamp or time value.

The mobile device may be configured to perform a cryptographic calculation to generate the CVC3 cryptogram for a particular transaction based on a cryptographic key, the generated UN as described above, a transaction count value, and static data stored on the mobile device.

Figure 13:
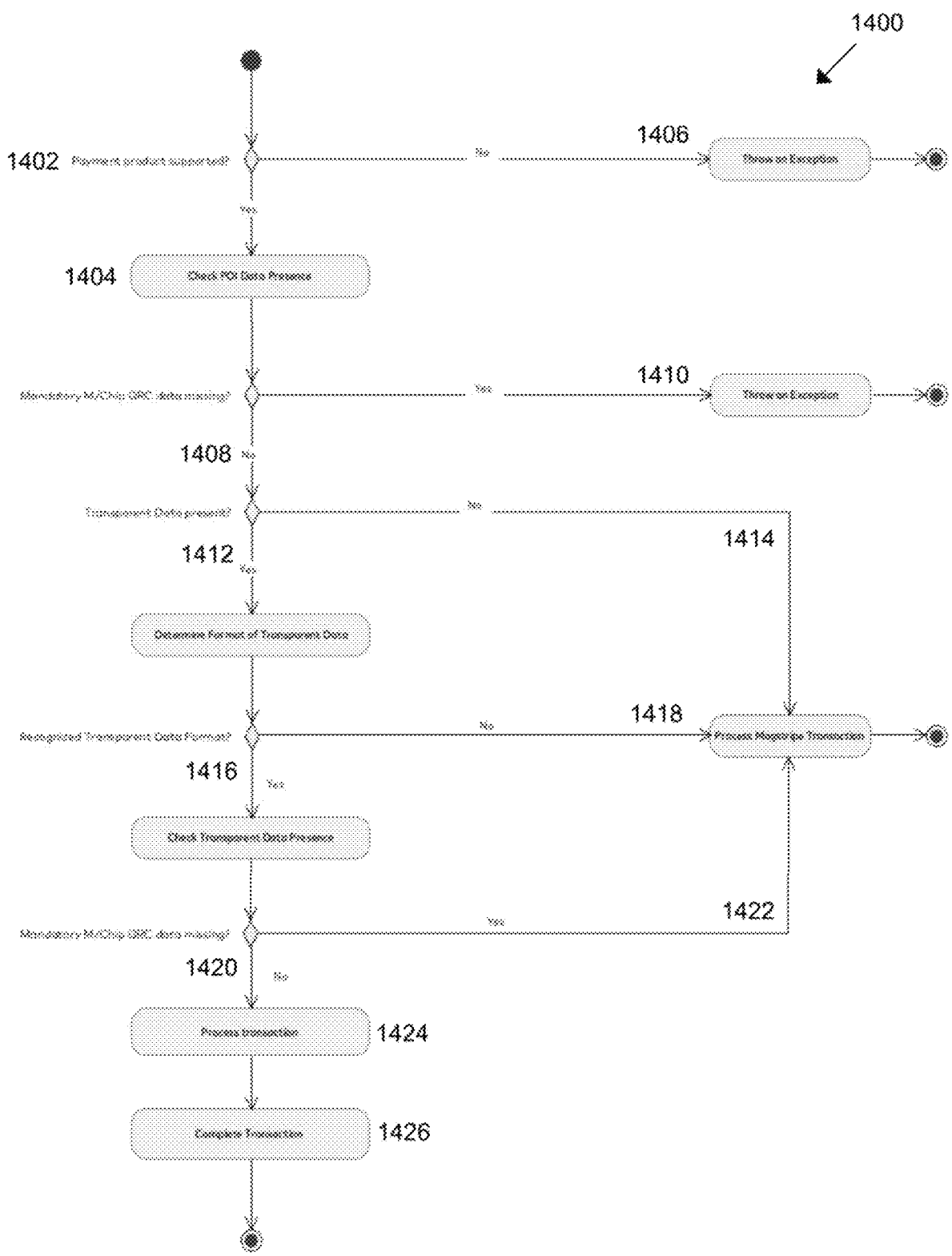
FIG. 13 shows a point-of-interaction (POI) processing decision tree for an EMV-QRCPS M/Chip transaction, in accordance with an embodiment of the disclosure.

FIG. 13 shows a point-of-interaction (POI) processing decision tree 1400 for an EMV-QRC M/Chip transaction, in accordance with an embodiment of the disclosure. POI transactions may be EMV-QRC (M/Chip) transactions or magnetic-stripe card-based payment transactions (Magstripe).

The first step is to check whether or not the payment product is supported 1402 (EMV-QRC). In this example, the selected payment product is M/Chip Digital QRC. A positive result proceeds to the next step, which is to check whether or not the mandatory POI data is present 1404. If the payment product is not supported, the POI throws an exception 1406. If the mandatory POI data is present 1408, the POI checks if the transparent data is present. If the mandatory POI data is missing, the POI throws an exception 1410. If the transparent data is not present, the POI proceeds to process a Magstripe transaction 1114. It the transparent data is present 1412, the format of the transaction data is determined—if the format is recognised 1416, the POI then checks if the mandatory transparent data is present; if the format is not recognised 1418, the POI proceeds to process a Magstripe transaction. Further, if the mandatory transparent data is missing 1422, the POI proceeds to process a Magstripe transaction. Given the presence of the mandatory transparent data 1420, the POI proceeds to process the M/Chip transaction 1424.

To process the M/Chip transaction, the Track 2 Equivalent Data (tag '57') is processed. Track 2 Equivalent Data must be provided in the QR Code and contains the data objects of the Track 2. Track 2 Equivalent Data has a maximum length of 37 positions. FIG. 14 comprises a table indicating the layout of the Track 2 Equivalent Data, which comprises the data field 1502, length 1504 and the format 1506.

The Track 2 Equivalent Data is processed by first extracting the PAN 1508 and Expiration Date 1510 components of the Track 2 Data and storing them as corresponding EMV data: Application PAN and Application Expiration Date. The issuer's specified restrictions on the geographic use and services allowed for the application is then checked. The transaction record is then built for authorization.

The completion 1426 of a transaction involves transaction disposition. The POI is responsible for indicating the transaction disposition to the cardholder, which is from an authorization response. A receipt is printed once the transaction is completed. In addition, the POI may be required to display POI messages, perform merchant specific processing and/or process additional data.

Further embodiments of the disclosure may be provided in accordance with the scope of the disclosure as defined here.

The invention claimed is:

1. A computer-implemented method at a user device comprising a main operating environment and a protected operating environment, the main operating environment comprising a processor and memories, the protected operating environment is at least one of a Subscriber Identity Module (SIM), Universal Integrated Circuit Card (UICC), a Secure Element, or a Trusted Execution Environment, the method comprising:
executing, by the protected operating environment of the user device, a wallet application; authenticating, by the protected operating environment of the user device, a user of the user device by a consumer device cardholder verification method (CDCVM);
receiving, by a user interface of the executing wallet application and from the user, transaction details of a transaction comprising at least a transaction amount;
displaying, by the executing wallet application, one or more payment cards on a display of the user device;
receiving, by the executing wallet application and from the user, a selection of a payment card of the one or more payment cards for the transaction;
generating, by the processor in the main operating environment, a time stamp of when the transaction details are received;

based on the authenticating of the user and the selection of the payment card, generating, by the executing wallet application and using the time stamp, a cryptogram and Europay, Mastercard, and Visa (EMV) data;

generating, by the executing wallet application, a 1-D barcode using the cryptogram and a 2-D barcode using the cryptogram and the EMV data, wherein the 1-D barcode and the 2-D barcode comprise the transaction amount;

simultaneously displaying, by the user interface of the executing wallet application at the user device, the 1-D barcode and the 2-D barcode on the display and to a merchant device;

receiving, by the processor in the main operating environment, a transaction delivery notification from a service provider computer; and displaying, by the processor in the main operating environment, the notification on the display.

2. The method of claim 1, wherein the 1-D barcode is a Code 128 barcode.

3. The method of claim 1, wherein the 2-D barcode is an EMV Quick Response Code.

4. The method of claim 3, wherein the time stamp comprises an unpredictable number.

5. The method of claim 1, wherein authenticating the user of the user device by the consumer device cardholder verification method comprises authenticating the user of the user device using a method selected from a group comprising:

A personal identification number (PIN), a password, and a biometric authentication mechanism.

6. A user computing device comprising:
a display;
a main operating environment;
a protected operating environment;
wherein the main operating environment and protected operating environment are separate environments;
at least one processor;
at least one memory storing a wallet application and executable instructions that when executed by the at least one processor causes the at least one processor to perform the operations of:

executing the wallet application in the protected operating environment;

authenticating, via the executing wallet application, a user by a consumer device cardholder verification method (CDCVM);

receiving, via a user interface of the executing wallet application, and from the user, transaction details of a transaction comprising at least a transaction amount;

displaying, via the executing wallet application, one or more payment cards on the display;

receiving, via the executing wallet application, a selection of a payment card of the one or more payment cards for the transaction;

generating, via the executing wallet application and using a time stamp of when the transaction details are received, transaction information comprising a cryptogram and Europay, Mastercard, and Visa (EMV) data;

based on the authenticating of the user and the selection of the payment card, generating, via the executing wallet application and using the time stamp, a cryptogram and EMV data;

generating, via the executing wallet application, a 1-D barcode using the cryptogram and a 2-D barcode using the cryptogram and the EMV data, wherein the 1-D barcode and the 2-D barcode comprise the transaction amount; and simultaneously displaying, via the user interface of the executing wallet application, the 1-D barcode and the 2-D barcode on the display and to a merchant device; and generating, in the main operating environment, the time stamp of when the transaction details are received; and receiving, in the main operating environment, a transaction delivery notification from a service provider computer; and displaying, in the main operating environment, the transaction delivery notification on the display.

* * * * *